July 16, 1968 D. STANIMIROVITCH 3,393,094
SEALED ALKALINE STORAGE CELLS HAVING A PRESSURE NOT IN EXCESS
OF 60MM OF MERCURY ABSOLUTE PRIOR TO CHARGING
Original Filed June 4, 1963 2 Sheets-Sheet 2

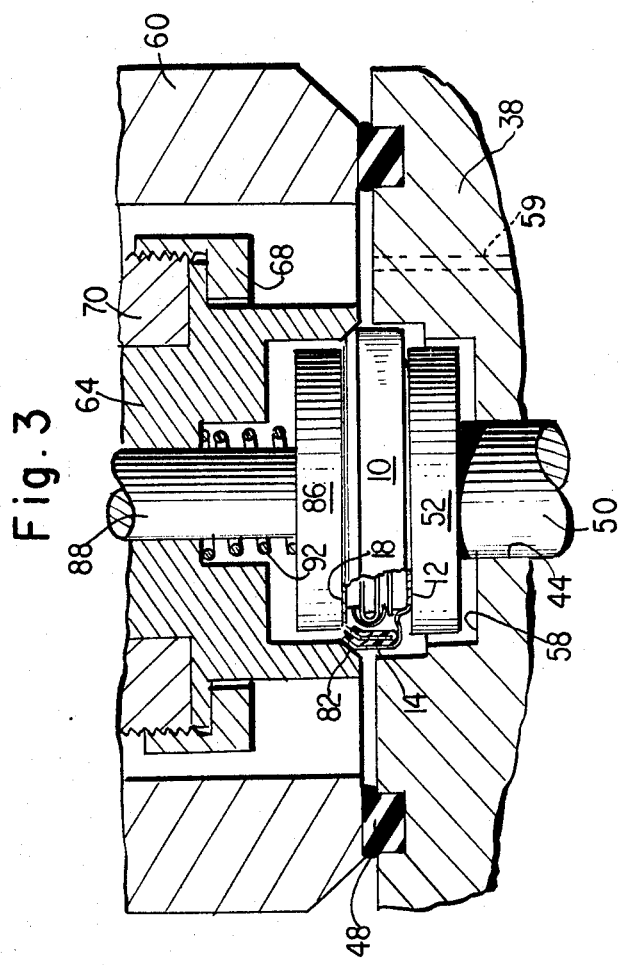
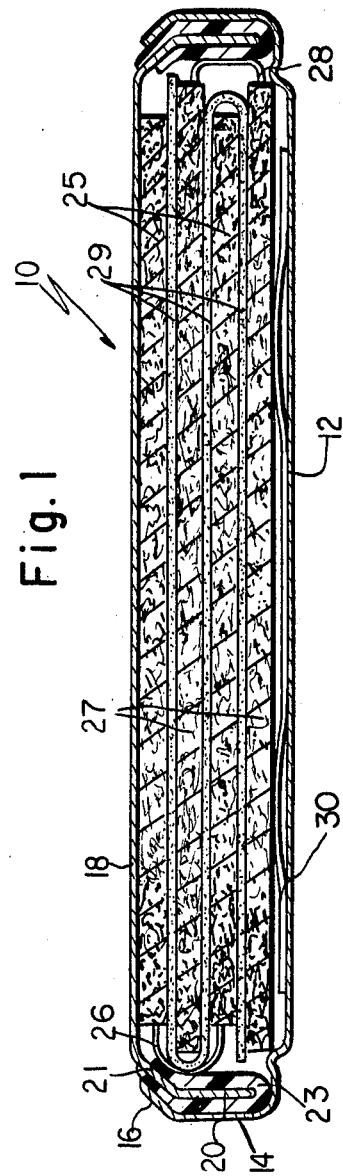

INVENTOR.
DOUCHAN STANIMIROVITCH
BY Kenyon & Kenyon
ATTORNEYS

3,393,094
SEALED ALKALINE STORAGE CELLS HAVING A PRESSURE NOT IN EXCESS OF 60 MM. OF MERCURY ABSOLUTE PRIOR TO CHARGING

Douchan Stanimirovitch, Paris, France, assignor to Societe des Accumulateurs Fixes et de Traction (Societe Anonyme), Romainville, France, a company of France
Continuation of application Ser. No. 285,324, June 4, 1963. This application Sept. 15, 1966, Ser. No. 579,781
Claims priority, application France, June 5, 1962, 899,760; Apr. 17, 1963, 931,786
9 Claims. (Cl. 136—6)

ABSTRACT OF THE DISCLOSURE

A sealed gas tight secondary cell having a thin positive electrode and a thin negative electrode spaced apart from 0.1 to 0.3 mm. with separator material in the spacing, the cell at the time of sealing having a pressure not in excess of 60 mm. of mercury absolute, and its negative electrode being then in discharged state, and charging of the cell not yet effected at such time, although the positive electrode then may have on it a charge up to 10% of its capacity and the cell having a free space when fully discharged that is greater than the volume of water formed upon its charging.

---

This application is a continuation of application Serial No. 285,324 filed June 4, 1963, now abandoned.

This invention relates to gastight alkaline storage cells or accumulators. More particularly, the invention relates to that kind of gastight cells in which the spacing between the electrodes is small being in the range of from .1 to .3 mm. or less so that the electrolysis products are hindered from passing through the gas state when the charging or overcharging current density is maintained under a given limit.

Such cells are preferably made with thin sintered electrodes no more than 1 mm. thick and, as is the standard practice in the alkaline battery manufacture, the capacity of the negative electrode is higher than the capacity of the positive electrode.

An object of the invention is the provision of cells and accumulators of the character mentioned wherein the limit of the charging and overcharging current can be substantially increased without the building of a dangerous overpressure within the casing.

In my prior application Ser. No. 207,180 filed July 3, 1962 now Patent No. 3,318,733, I have disclosed an alkaline storage cell which is capable of sustaining a considerably higher charging and over-charging current than conventional cells of that type. The ability to sustain a higher charging current is achieved in that application by substituting an oxygen atmosphere to the air atmosphere of the cell before sealing. Thus the partial pressure of oxygen being increased the solubility of oxygen is also increased, and so is the rate of diffusion of dissolved oxygen to the cathode. The oxygen evolved at the end of the charge and during overcharge can then be transferred to the cathode in the dissolved state at a high rate to be consumed on the cathode before reaching the saturation for relatively high current densities.

However the results were not quite as high as expected, probably due to the fact that some nitrogen remained in the cell without being expelled by oxygen.

I have now found according to the present invention that the charging and overcharging current capability is still further substantially improved by sealing the cell under high vacuum, i.e., an absolute pressure not exceeding 60 mm. of mercury, and advantageously about 10 mm. of mercury.

This cell will now be described in detail with respect to a specific embodiment thereof, as illustrated in the accompanying drawings, wherein:

FIGURE 1 is a sectional view of a storage cell according to this invention;

FIGURE 3 is a vertical sectional view of a cell and a portion of the apparatus shown in FIGURE 2, illustrating the press in closed position wherein a cell casing is sealed.

Figure 2:
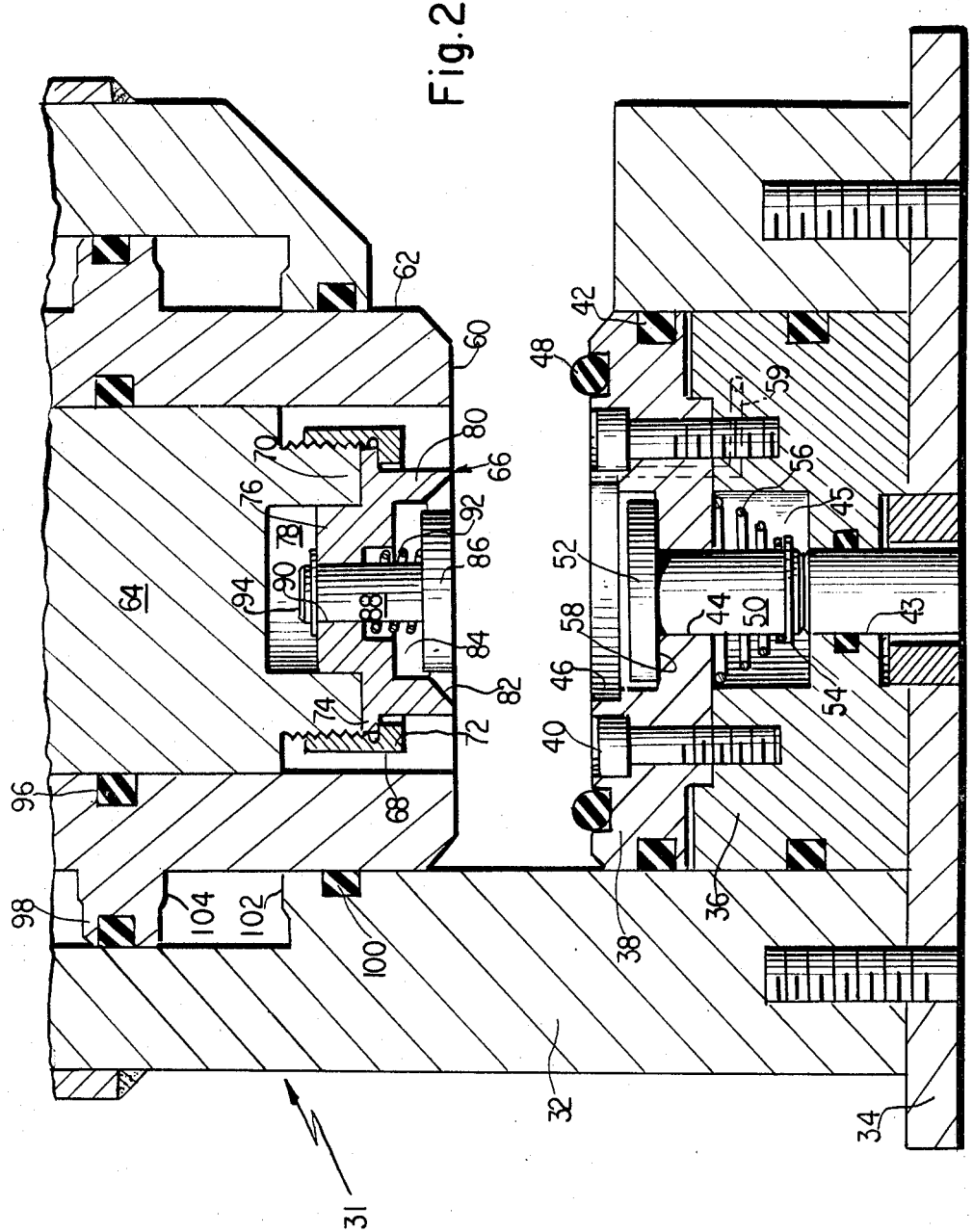
FIGURE 2 is a vertical sectional view of a press for closing and evacuating cells of this invention, showing the press in the open position.

Referring now to FIGURE 1 of the drawings, 10 is a cell casing having a thin, circular lower casing shell 12 with an upwardly directed cylindrical outer portion 14 and a diagonally turned down portion 16 at the outer edge thereof, a thin, circular upper casing shell 18 having a substantially cylindrical downturned outer edge portion 20 and a frusto-conical portion 21 situated between flat circular portion 18 and cylindrical portion 20 and substantially parallel to the outermost portion 16 of lower casing shell 12, and a substantially U-shaped insulating sealing gasket 23, which is in gastight contact with both the inner and outer walls of portions 20 and 21 of upper casing shell 18 and with the inner wall portions 14 and 16 of lower casing shell 12. The interior of the cell 10 contains a positive electrode 25 consisting of a plurality of thin plates interconnected by electrical connectors 26 at the edges of said plates, a negative electrode 27 consisting of a plurality of thin plates electrically connected by connectors 28 at the edges thereof, and porous separators 29 which separate adjacent electrodes. The casing also contains a spring 30 which compresses the electrodes and separators into close engagement with the adjacent parts and maintains the elements in their places.

Both the positive and negative electrodes are preferably of sintered carrier material impregnated with suitable active materials such as those disclosed in United States Patents Nos. 2,646,455 and 2,681,375. Nickel oxides or hydroxides constitute a suitable active material for the positive electrode, as disclosed in said prior patents. Silver is another suitable material for the positive electrode. The negative electrode contains cadmium as its reactive material, as disclosed in said United States Patents Nos. 2,646,455 and 2,681,375 previously mentioned. The electrodes according to this invention are thin, generally ranging in thickness from about 0.2 mm. to about 1 mm. A typical thickness is about 0.8 mm.

Iron should not be used as a negative electrode material. Although iron has been successfully used in vented alkaline storage cells, there is no means known at present for preventing hydrogen evolution at an iron electrode and there is no positive active material known for recombining hydrogen at a useful rate.

The separators 29 are preferably composed of a porous, highly capillary substance which is resistant to electrolyte, but which, when fully impregnated, is capable of holding several times its own weight in electrolyte. Such impregnated materials provide a minimum of internal cell resistance by avoiding the presence of gas pockets between the electrodes. The interplate spacing between a positive electrode plate and a negative electrode plate is in the range of about 0.1 mm. to about 0.3 mm.

The electrolyte in cells of this invention is a conventional alkaline electrolyte such as that disclosed in United States Patents Nos. 2,646,455 and 2,681,375.

Referring now to FIGURES 2 and 3 of this invention, there is illustrated a press which is suitable for evacuating and sealing cells of the present invention. Press 31 contains an upright frame member 32 bolted to and supported on plate 34. Also supported on plate 34 is a die holder 36 and the die 38, which are bolted together by means of bolts 40. Sealing rings 42 maintain a fluid-tight seal between the inner wall of frame member 32 and the walls of die holder 36 and die 38. Both die holder 36 and die 38 are cylindrical, and both have cylindrical bores 43 and 44 which are axially aligned and concentric with the axes of die holder 36 and die 38. Bore 43 of die holder 36 is enlarged at its upper end to provide a hollow cylindrical chamber 45. Bore 44 in die 38 is enlarged at its upper end to form chamber 46. The top face of die 38 contains a circular sealing ring 48, shown here as an O-ring, which is set in a recess of an encircling chamber. Mounted for reciprocation in bores 43 and 44 is a piston stem 50 which is attached at its lower end to a piston (not shown) and which has affixed thereto at its upper end a plate 52 which reciprocates in chamber 46. A collar 54 is provided on piston stem 50, and spring 56 located in chamber 45 bears against this collar and against the lower surface of die 38 for urging the piston of plate 52 downwardly. Downward movement of plate 52 is limited by the shoulder 58 between bore 44 and chamber 46. A conduit 59 in die holder 36 and die 38 is adapted to be connected at one end to a source of vacuum (not shown) and terminates at its other end in the upper face of die 38.

Press 31 also contains a movable member, generally indicated at 60, which is located above die 38. Said movable member comprises sleeve 62 and piston 64 fixedly secured thereto, and a tool head 66 which is fixedly secured to piston 64 by means of a nut 68. Piston 64 has a depending annular portion 70 which is externally screw-threaded to receive the internally screw-threaded nut 68. Nut 68 has an inwardly directed flange 72 which underlies and supports an outwardly projecting flange 74 on tool head 66. The upper surface of flange 74 bears against the lower surface of depending annular portion 70 of piston 64. Tool head 66 has an upstanding cylindrical boss 76 having the same external diameter as the internal diameter of annulus 70 but a smaller depth, thus forming chamber 78. Tool head 66 also has a depending annular boss 80 which has a beveled inner surface 82. A hollow chamber 84 is enclosed by boss 80. In this hollow chamber there is a vertically reciprocatable plate 86 which has a stem 88 reciprocating within cylindrical bore 90 in boss 76. Compression spring 92 in chamber 84 biases plate 86 downwardly, and the downward movement of plate 86 is limited by limit stop 94 which is located in chamber 78. A sealing ring 96 provides for a fluid-tight seal between surfaces of sleeve 62 and piston 64. Sealing rings 98 and 100 provide for fluid-tight seals between sleeve 62 and frame member 32. Downward movement of movable member 60 is limited by shoulder 102 on frame member 32 and outwardly directed flange 104 on sleeve 62.

Movable member 60 is shown in its lowermost position in FIGURE 3. In this position sleeve 62 engages sealing ring 48, the lowermost surface of sleeve 62 being in a position proximate to, but not touching, the upper surface of die 38. Plate 52 is shown herein in a slightly raised position supporting the lower casing 12 of cell 10 which is being sealed. Plate 86 in movable member 60 is shown bearing against the upper casing shell 18 of cell 10, thereby closing cell 10. When movable member 60 is in its lowermost position as shown in FIGURE 3, beveled surface 82 strikes the upwardly directed cylindrical portion 14 of shell 12, bending the same inwardly diagonally as shown at 16 in FIGURE 1, thereby compressing outer portion 16, sealing member 23, and portion 21 of upper casing shell 18 together in gas-tight relationship. Sleeve 62 contacts sealing ring 48, and the space enclosed therein is put under vacuum before closure and sealing of cell 10 is effected. Thus the cell at the time of sealing has a very low pressure, equal to the pressure in conduit 59. This pressure, as previously indicated, should be less than 60 mm. of mercury absolute. A suitable pressure is about 10 mm. of mercury absolute. Thus it is seen that the button cell is sealed under vacuum in this device.

Cells according to this invention are provided with a small free space. This free space, in the fully discharged condition of the cell, must be greater than the volume of water which is formed during charging, which is approximately ⅔ ml. per ampere hour. Preferably the total free space in the cell should be about 1 ml. for every ampere of cell capacity. Although more than this amount of free gas can be provided, such increased volume does not serve any useful purpose and may unduly lengthen the amount of time for the cell to reach equilibrium as will be seen hereafter. For example, a button cell having a capacity of 0.25 ampere should have a total free space of about 0.25 ml.

Cells according to this invention can be continuously charged and overcharged for periods up to 20 days or longer at a charging rate of up to C/10 or C/8 (these rates representing ⅒ and ⅛, respectively, of the cell capacity when current is expressed in amperes and capacity in ampere hours) without disturbing the equilibrium in the cell and consequently without the building up of dangerous overpressures. Higher charging currents, for example up to C/5, can be maintained for brief periods, but continued charging at this rate is not recommended.

It is believed that the successful operation of cells of this invention can be explained as follows. When the evacuated cell reaches the end of the charge oxygen is evolved on the positive plate, since the capacity of the negative plate is higher than that of the positive plate. The pressure inside the cell being very low gaseous oxygen will fill the free space of the cell. An equilibrium exists between gaseous oxygen in the free space and oxygen dissolved in the electrolyte, the amount of dissolved oxygen increasing as the gas pressure increases. A decrease in the gaseous oxygen pressure should shift this equilibrium towards the oxygen evolution. Experience corroborates this.

An advantage which is perhaps the main one, is added to this advantage as to safety, said advantage coming from the special operation of such a cell.

The rate of diffusion of oxygen dissolved in the electrolyte will be very small due to the fact that the partial pressure of oxygen is very low. Thus the positive electrode will be polarized which causes a violent evolution of gaseous oxygen. Said oxygen will gather in the free space. An oxygen pressure is thus created and in turn such pressure will increase the dissolution coefficient of oxygen hence an increase in the concentration gradient of dissolved oxygen.

The diffusion of oxygen towards the negative electrode will be sharply increased since it is substantially proportional to the concentration gradient of dissolved oxygen. The value of such diffusion will therefore correspond to the cause which has given rise to it, i.e. to the charging or overcharging current which caused the gas evolution, thus creating an oxygen overpressure.

The more important has been the evolution of gaseous oxygen, i.e. the higher has been the charging current density, the more automatically suited to the new conditions will be the ensuing diffusion.

Thus the system has become very substantially self regulating which is the second advantage hereabove mentioned.

If the overcharge is stopped, an overpressure prevails in the cell at this moment. Such overpressure will then be decreasing due to secondary reactions which take place in the cathode compartment through the action of the dissolved oxygen, which will then come from the oxygen causing the overpressure in the free space. Lastly the free oxygen will be nearly wholly fixed on the cathode, more especially through secondary reactions when said cathode is constituted by a sintered nickel plate impregnated by cadmium hydroxide which is the negative active material.

The system is thus become very reliable since it is again placed in its initial conditions.

This self regulating phenomenon could in principle occur according to the described mechanism provided of course that the cell is placed in a casing which can withstand sufficient pressure. The pressure prevailing in the cell must in fact be directly related to this current, since this pressure should enable all the oxygen which must be carried by diffusion to the cathodic compartment where it is consumed, to be maintained in the dissolved state. However, such oxygen consummation which is of an electrolytical nature, is submitted to a limit rate which is the highest possible. It would not therefore be of any use to try increasing the rate of diffusion of dissolved oxygen above this limit rate of consummation, but the invention retains all its advantages for the current densities such that the charging current is not higher than e.g. C/5 amp. (C being the capacity of the cell in amp.-hrs.), which corresponds to a 5 hour rate; for such current densities the limit rate of oxygen consumption is not yet reached and the oxygen pressure required for the operation is lower than 10 kg./cm.$^2$.

It has been usual in cells of this type to provide a negative electrode having a larger capacity than the positive electrode This was done so that oxygen and not hydrogen would be the first gas to be evolved when the cell was charged. However, this result was not always attained. I have found that the important factor is not simply electrode capacity, but electrode efficiency. As long as the charging efficiency of the electrode, i.e., the percentage of charging current which actually is used in charging the electrode, amounts to 100%, no gas evolution takes place. As soon as the charging efficiency falls below 100%, gas evolution may take place. It is possible that gas evolution may take place first at the electrode having the greater capacity, in the event that the efficiency of this electrode is lower than that of the other electrode. The charged positive electrode being made of higher oxides, oxygen will be evolved earlier if the partial pressure of oxygen is lower. Thus the positive electrode will have a greater tendency in evolving oxygen before any hydrogen is evolved at the negative electrode.

In one embodiment of the invention a small determined precharge is given to the electrode. This may be about 5% to 10% of the initial capacity of the electrode. The cell is then closed, with the positive electrode being initially precharged to this extent and the negative electrode being completely discharged. Due to the vacuum created in the cell at the time of closing, some decomposition of the higher nickel oxides of the positive electrode may take place, resulting in a limitation of the precharge of the positive electrode to the value which is just necessary for obtaining the required oxygen evolution during overcharge of cells and during overdischarge. By precharging the positive electrode to a slight extent, the capacity of this cell is limited to the capacity of the charged part of the negative electrode, thereby assuring that during overdischarge, the negative electrode is the first to fail, which causes an immediate oxygen evolution. Such oxygen may then migrate to the cathode compartment by diffusion (the cathode being the positive electrode during reversal). The secondary reactions by which dissolved oxygen is consumed take place so that evolution of hydrogen at the positive electrode during reversal is prevented.

Thus it is not necessary that the precharge on the positive electrode have a high value, since such precharge should only be enough to start the phenomenon of secondary reactions during reversal. The corresponding decrease of the useful capacity of the cell as compared to the usual capacity of the cell (i.e. that of the positive electrode) reaches a reasonable value since this decrease is substantially equal to the precharge given to the positive electrode.

The cells evacuated at the time of closing according to this invention possess at least two advantages over prior cells. The first, already indicated, is that much higher charging currents can be used. The second is a safety advantage in assuring that no hydrogen gas is evolved either during overcharge or during overdischarge. By maintaining a very low partial pressure of oxygen at the moment of gas-tight closure of the cell, oxygen will have a tendency to be evolved more quickly than would otherwise take place.

The present invention has been illustrated with specific reference to a button cell. It is understood, however, that this is merely by way of illustration and that the invention is also applicable to cells of other sizes and shapes, as for example prismatic cells. This invention shall not be limited by reference to the specific embodiments provided for the purpose of illustration, but shall be limited only by the scope and spirit of the appended claims.

What is claimed is:

1. A gas-tight secondary cell comprising a sealed casing having a pressure not in excess of 60 mm. of mercury absolute prior to charging, said casing having disposed therein a positive electrode, a negative electrode, the spacing between the plates of electrodes of opposite polarity being in the range of from 0.1 to 0.3 mm., separator means disposed in this spacing and an alkaline electrolyte, said cell having the characteristics at the time of sealing thereof, that it has a pressure not in excess of 60 mm. of mercury absolute, that its negative electrode is in the discharged state, and that charging of said cell has not yet been effected.

2. The cell of claim 1 wherein each of said electrodes has a thickness of about 0.2 mm. to about 1 mm.

3. The cell of claim 1 wherein said positive electrode is comprised of nickel oxide and said negative electrode is comprised of cadmium oxide.

4. The cell of claim 1 wherein said negative electrode has a greater capacity than that of the positive electrode.

5. The cell of claim 1 wherein said positive electrode has a charge of no more than about 10% of its capacity at the time of sealing thereof.

6. A gas-tight secondary cell comprising a sealed casing having a pressure not in excess of 60 mm. of mercury absolute prior to charging, said casing having disposed therein a positive electrode, a negative electrode, the spacing between the plates of the electrodes of opposite polarity being in the range of from 0.1 to 0.3 mm., separator means disposed in this spacing and an alkaline electrolyte, said cell having the characteristic when it is fully discharged that the total free space is greater than the volume of water formed upon charging, said cell having the further characteristics at the time of sealing thereof, that it has a pressure not in excess of 60 mm. of mercury absolute, that its negative electrode is in the discharged state and that charging of said cell has not yet been effected.

7. The cell of claim 6 wherein each of said electrodes has a thickness of about 0.2 mm., to about 1 mm.

8. The cell of claim 6 wherein said positive electrode is comprised of nickel oxide and said negative electrode is comprised of cadmium oxide.

9. The cell of claim 6 wherein said positive electrode has a charge of no more than about 10% of its capacity at the time of sealing thereof.

References Cited

UNITED STATES PATENTS

| 2,842,607 | 7/1958 | Germershausen et al. | 136—21 |
| 2,857,447 | 10/1958 | Lindstrom | 136—34 |
| 2,903,496 | 9/1959 | Vogt | 136—24 |
| 3,180,760 | 4/1965 | Rauter | 136—6 |

WINSTON A. DOUGLAS, *Primary Examiner.*

ALLEN B. CURTIS, *Examiner.*

A. SKAPARS, *Assistant Examiner.*